(12) United States Patent
Querze, III et al.

(10) Patent No.: US 10,848,849 B2
(45) Date of Patent: Nov. 24, 2020

(54) PERSONALLY ATTRIBUTED AUDIO

(71) Applicant: Bose Corporation, Framingham, MA (US)

(72) Inventors: Elio Dante Querze, III, Arlington, MA (US); Todd Richard Reily, North Reading, MA (US); Conor William Sheehan, Natick, MA (US); Daniel James Buckley, Newton, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/368,920

(22) Filed: Mar. 29, 2019

(65) Prior Publication Data

US 2020/0314524 A1    Oct. 1, 2020

(51) Int. Cl.
*G06F 3/16*  (2006.01)
*H04R 1/10*  (2006.01)

(52) U.S. Cl.
CPC .......... *H04R 1/1041* (2013.01); *G06F 3/165* (2013.01); *H04R 2420/07* (2013.01)

(58) Field of Classification Search
None
See application file for complete search history.

(56) References Cited

U.S. PATENT DOCUMENTS

| | | | | |
|---|---|---|---|---|
| 2009/0138507 | A1* | 5/2009 | Burckart | G11B 27/105 |
| 2012/0052884 | A1* | 3/2012 | Bogatin | G01S 5/10 |
| | | | | 455/456.6 |
| 2012/0290653 | A1* | 11/2012 | Sharkey | H04W 4/023 |
| | | | | 709/204 |
| 2014/0185823 | A1* | 7/2014 | Seligmann | H04R 27/00 |
| | | | | 381/92 |
| 2016/0162252 | A1* | 6/2016 | Di Censo | G11B 27/11 |
| | | | | 700/94 |
| 2018/0322335 | A1* | 11/2018 | Golan | G06F 3/165 |
| 2019/0246235 | A1 | 8/2019 | Bruser et al. | |

OTHER PUBLICATIONS

Flynn, Laurie J. "Music Player From Microsoft Offers Wireless Song-Sharing." The New York Times, Sep. 15, 2006, www.nytimes.com/2006/09/15/technology/15soft.html. (Year: 2006).*

Rao, Leena. "Lokast Brings Proximity Based Mobile Social Network To Android Phones." TechCrunch, Jul. 21, 2010, techcrunch.com/2010/07/21/lokast-brings-proximity-based-mobile-social-network-to-android-phones/. (Year: 2010).*

"LoKast: Share your media with anyone quickly & simply." YouTube, MobileDeveloperTV, Mar. 15, 2010, www.youtube.com/watch?v=wv_Otk5Cot8. (Year: 2010).*

J. L. Salmon and R. Yang, "A Proximity-Based Framework for Mobile Services," 2014 IEEE International Conference on Mobile Services, Anchorage, AK, 2014, pp. 124-131, doi: 10.1109/MobServ.2014.26. (Year: 2014).*

* cited by examiner

*Primary Examiner* — James K Mooney
(74) *Attorney, Agent, or Firm* — Hoffman Warnick LLC

(57) ABSTRACT

Various implementations include approaches for controlling a wearable audio device. Particular approaches include: receiving data indicating the wearable audio device is proximate an additional wearable audio device worn by an additional user and running a personally attributed audio engine; and initiating personally attributed audio playback at the wearable audio device, where the personally attributed audio playback includes audio playback associated with the additional user.

27 Claims, 4 Drawing Sheets

PERSONALLY ATTRIBUTED AUDIO

TECHNICAL FIELD

This disclosure generally relates to audio devices. More particularly, the disclosure relates to audio devices, such as wearable audio devices, configured for personally attributed audio playback.

BACKGROUND

Portable electronic devices, including headphones and other wearable audio systems are becoming more commonplace. However, these devices can be socially isolating for some users.

SUMMARY

All examples and features mentioned below can be combined in any technically possible way.

Various implementations include wearable audio devices and approaches for controlling a wearable audio device. Particular approaches include: receiving data indicating the wearable audio device is proximate an additional wearable audio device worn by an additional user and running a personally attributed audio engine; and initiating personally attributed audio playback at the wearable audio device, where the personally attributed audio playback includes audio playback associated with the additional user.

In some particular aspects, a computer-implemented method of controlling a wearable audio device configured to provide an audio output to a user includes: receiving data indicating the wearable audio device is proximate an additional wearable audio device worn by an additional user and running a personally attributed audio engine; and initiating personally attributed audio playback at the wearable audio device, where the personally attributed audio playback includes audio playback associated with the additional user.

In other particular aspects, a wearable audio device includes: a transducer for providing an audio output; and a control circuit coupled with the transducer, the control circuit configured to: receive data indicating the wearable audio device is proximate an additional wearable audio device worn by an additional user and running a personally attributed audio engine; and initiate personally attributed audio playback at the wearable audio device, where the personally attributed audio playback includes audio playback associated with the additional user.

Implementations may include one of the following features, or any combination thereof.

In particular aspects, initiating the personally attributed audio playback at the wearable audio device is performed in response to determining that the wearable audio device has permitted personally attributed audio playback from the additional wearable audio device.

In certain cases, the personally attributed audio playback is selected by the additional user, or by the user of the wearable audio device based upon a stored categorization of the additional user.

In some implementations, the personally attributed audio playback includes music or an audible tone, and the personally attributed audio playback is variable based upon a context attributed to the wearable audio device.

In particular cases, the method further includes: receiving data indicating the wearable audio device is proximate a further additional wearable audio device worn by a further additional user and running the personally attributed audio engine; and initiating the personally attributed audio playback from at least one of the additional wearable audio device or the further additional wearable audio device, at the wearable audio device, where the personally attributed audio playback from the further additional wearable audio device includes audio playback associated with the further additional user.

In certain aspects, the personally attributed audio playback from the additional wearable audio device and the personally attributed audio playback from the further additional wearable audio device are mixed at the wearable audio device.

In some implementations, the method further includes selecting between the personally attributed audio playback from the additional wearable audio device or the personally attributed audio playback from the further additional wearable audio device based upon a relative priority of the additional user as compared with the further additional user.

In certain cases, the relative priority is based upon at least one of: a geographic proximity of the additional wearable device and the further additional wearable audio device to the wearable audio device, a social graph comprising social connections between the user and at least one of the additional user or the further additional user, or a commonality of interests in audio content between the user and at least one of the additional user or the further additional user.

In particular aspects, proximity between the wearable audio device and the additional wearable audio device is determined by user settings defined by the user of the wearable audio device.

In some cases, the personally attributed audio playback is output at the wearable audio device in a spatially rendered audio location based upon a location of the additional user.

In certain implementations, the method further includes adjusting the spatially rendered audio location of the personally attributed audio playback based upon detected movement of the additional user relative to the wearable audio device.

In some aspects, the method further includes: receiving feedback about the personally attributed audio playback from the user at the wearable audio device, where the feedback includes: a request for additional information about the personally attributed audio playback, a judgment score about the personally attributed audio playback or a request to mimic the personally attributed audio playback; and providing audio playback including a description of the personally attributed audio playback in response to receiving the request for additional information about the personally attributed audio playback, sending a signal to the additional wearable audio device indicating the judgment score from the user in response to receiving the judgement score, or adjusting audio playback at the wearable audio device to match the personally attributed audio playback of the additional user in response to receiving the request to mimic the personally attributed audio playback.

In particular implementations, the additional wearable audio device includes a plurality of additional wearable audio devices, and the method further includes providing a report comprising a listing of the personally attributed audio playback for each of the plurality of additional wearable audio devices that have entered the proximity of the wearable audio device during a period.

In some aspects, the additional wearable audio device includes a plurality of additional wearable audio devices, and the method further includes: in response to the user entering a geographic location, prompting the user of the wearable audio device to initiate playback of the personally attributed audio playback for at least one of the plurality of additional wearable audio devices that have entered the geographic location within a period.

In particular cases, the additional wearable audio device includes a plurality of additional wearable audio devices, where the wearable audio device determines proximity to the plurality of additional wearable audio devices by: sending location and orientation data associated with the wearable audio device to a cloud-based server; receiving coordinate data from the cloud-based server about N number of additional wearable audio devices within a perimeter of the wearable audio device; and receiving audio stream uniform resource locators (URLs) for the corresponding personally attributed audio playback from the cloud-based server, where the wearable audio device is configured to access the personally attributed audio playback with the corresponding URL for the additional user.

In particular aspects, when a primary audio output is provided to the user at the wearable audio device and the personally attributed audio playback is initiated, the method further includes at least one of: pausing the primary audio output while providing the personally attributed audio playback, reducing a volume of the primary audio output while providing the personally attributed audio playback, or mixing the primary audio output with the personally attributed audio playback.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
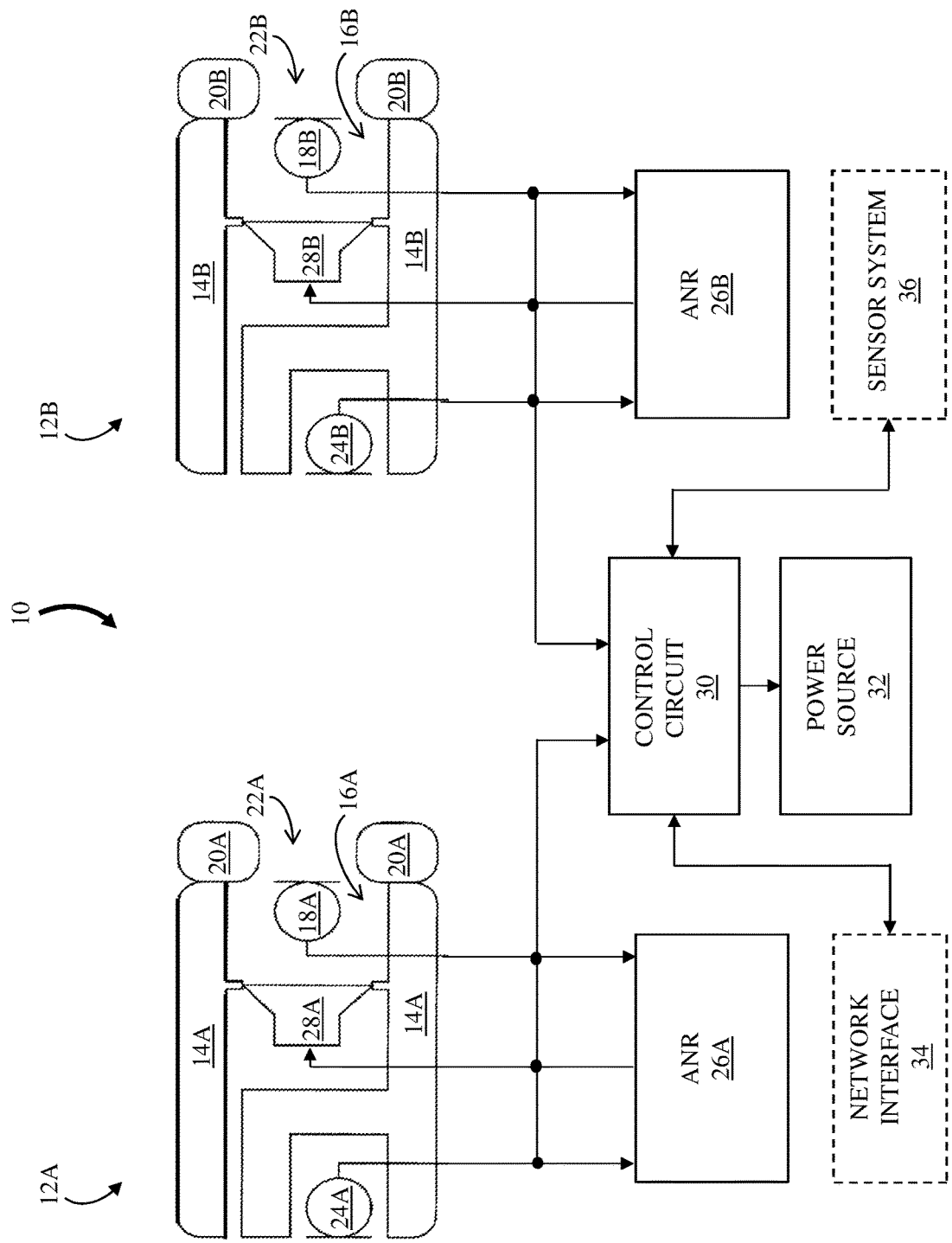
FIG. 1 is a block diagram depicting an example wearable audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a personally attributed audio engine can be beneficially incorporated into a wearable audio device to provide added functionality. For example, a wearable audio device can be configured to detect a proximate wearable audio device that is running a personally attributed audio engine, and provide personally attributed audio playback reflective of attributes of the user of that proximate wearable audio device.

Commonly labeled components in the FIGURES are considered to be substantially equivalent components for the purposes of illustration, and redundant discussion of those components is omitted for clarity.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ wearable audio devices to perform these functions. For those who employ headphones or headset forms of wearable audio devices to listen to electronically provided audio, it is commonplace for that audio to be provided with at least two audio channels (e.g., stereo audio with left and right channels) to be acoustically presented with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it is commonplace to combine ANR with other audio functions in headphones.

Aspects and implementations disclosed herein may be applicable to a wide variety of wearable audio devices in various form factors, such as headphones, earphones, open-ear audio devices, watches, glasses, neck-worn speakers, shoulder-worn speakers, body-worn speakers, etc. Unless specified otherwise, the term headphone, as used in this document, includes various types of wearable audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of wearable audio devices such as head, shoulder or body-worn acoustic devices that include one or more acoustic drivers to produce sound without contacting the ears of a user. Some particular aspects disclosed may be particularly applicable to personal (wearable) audio devices such as glasses, headphones, earphones or other head-mounted audio devices. It should be noted that although specific implementations of wearable audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to wearable audio devices that either do or do not support two-way communications, and either do or do not support active noise reduction (ANR). For wearable audio devices that do support either two-way communications or ANR, it is intended that what is disclosed and claimed herein is applicable to a wearable audio device incorporating one or more microphones disposed on a portion of the wearable audio device that remains outside an ear when in use (e.g., feedforward microphones), on a portion that is inserted into a portion of an ear when in use (e.g., feedback microphones), or disposed on both of such portions. Still other implementations of wearable audio devices to which what is disclosed and what is claimed herein is applicable will be apparent to those skilled in the art.

FIG. 1 is a block diagram of an example of a wearable audio device 10 having two earpieces 12A and 12B, each configured to direct sound towards an ear of a user. This wearable audio device 10 is shown to illustrate functions of a personally attributed audio engine, as described herein. This wearable audio device 10 is merely one example of a wearable audio device, according to various implementations. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where wearable audio device 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR, the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

In implementations of a wearable audio device 10 that include an ANR circuit 26, the corresponding ANR circuit 26A, B is in communication with the inner microphones 18, outer microphones 24, and electroacoustic transducers 28, and receives the inner and/or outer microphone signals. In certain examples, the ANR circuit 26A, B includes a microcontroller or processor having a digital signal processor (DSP), and the inner signals from the two inner microphones 18 and/or the outer signals from the two outer microphones 24 are converted to digital format by analog to digital converters. In response to the received inner and/or outer microphone signals, the ANR circuit 26 can communicate with the control circuit 30 to initiate various actions. For example, audio playback may be initiated, paused or resumed, a notification to a user (e.g., wearer) may be provided or altered, and a device in communication with the wearable audio device may be controlled. In implementations of the wearable audio device 10 that do not include an ANR circuit 26, the microcontroller or processor (e.g., including a DSP) can reside within the control circuit 30 and perform associated functions described herein.

The wearable audio device 10 also includes a power source 32. The control circuit 30 and power source 32 may be in one or both of the earpieces 12 or may be in a separate housing in communication with the earpieces 12. The wearable audio device 10 may also include a network interface 34 to provide communication between the wearable audio device 10 and one or more audio sources and other wearable audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from wearable audio device 10. The network interface 34 can provide for communication between the wearable audio device 10, audio sources and/or other networked (e.g., wireless) speaker packages and/or other audio playback devices via one or more communications protocols. The network interface 34 may provide either or both of a wireless interface and a wired interface. The wireless interface can allow the wearable audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, if a user connects an AirPlay® enabled device, such as an iPhone or iPad device, to the network, the user can then stream music to the network connected audio playback devices via Apple AirPlay®. The audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the wearable audio device 10, such as control of user interfaces (not shown) and applications run by the wearable audio device 10.

In implementations of the wearable audio device 10 having an ANR circuit 26, that ANR circuit 26 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices. However, in additional implementations of the personal audio device 10 that do not include an ANR circuit 26, these D/A converters, amplifiers and associated circuitry can be located in the control circuit 30.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling personally attributed audio functions according to various particular implementations. It is understood that portions of the control circuit 30 (e.g., instructions) can also be stored in a remote location or in a distributed location, and can be fetched or otherwise obtained by the control circuit 30 (e.g., via any communications protocol described herein) for execution. The instructions may include instructions for controlling personally attributed audio selection-based processes (i.e., the software modules include logic for processing inputs from a user and/or sensor system to manage audio streams), as well as digital signal processing and equalization.

While various features of the wearable audio device 10 are described as being performed at the control circuit 30 running on that wearable audio device 10, it is understood that one or more functions can be controlled or otherwise run (e.g., processed) by software and/or hardware that resides at a physically distinct device such as a smart device. That is, one or more functions of the control circuit 30 can be performed using a software application that runs on a connected smart device and/or in a cloud-based processing mechanism. Depending upon the processing, storage and/or power capabilities of the wearable audio device 10, certain functions may be more effectively executed at a connected smart device.

Wearable audio device 10 can also include a sensor system 36 coupled with control circuit 30 for detecting one or more conditions of the environment proximate wearable audio device 10. Sensor system 36 can include inner microphones 18 and/or outer microphones 24, sensors for detecting inertial conditions at the wearable audio device 10 and/or conditions of the environment proximate wearable audio device 10 as described herein. The sensors may be on-board the wearable audio device 10, or may be remote or otherwise wireless (or hard-wired) connected to the wearable audio device 10. As described further herein, sensor system 36 can include a plurality of distinct sensor types for detecting inertial information, environmental information, or commands at the wearable audio device 10. In particular implementations, sensor system 36 can enable detection of user movement, including movement of a user's head or other body part(s), and/or the look direction of a user. In particular, portions of sensor system 36 may incorporate one or more movement sensors, such as accelerometers, gyroscopes and/or magnetometers. In some particular implementations, sensor system 36 can include a single IMU having three-dimensional (3D) accelerometers, gyroscopes and a magnetometer.

In various implementations, the sensor system 36 can be located at the wearable audio device 10, e.g., where an IMU is physically housed in the wearable audio device 10. In some examples, the sensor system 36 (e.g., including the IMU) is configured to detect a position, or a change in position, of the wearable audio device 10. This inertial information can be used to control various functions described herein. For example, the inertial information can be used to trigger a command function, such as activating an operating mode of the wearable audio device 10 (e.g., a personally attributed audio mode), modify playback of an audio sample in a spatial audio mode, or initiate playback of audio content associated with one or more samples.

The sensor system 36 can also include one or more interface(s) for receiving commands at the wearable audio device 10. For example, sensor system 36 can include an interface permitting a user to initiate functions of the wearable audio device 10. In a particular example implementation, the sensor system 36 can include, or be coupled with, a capacitive touch interface for receiving tactile commands on the wearable audio device 10.

In other implementations, as illustrated in the phantom depiction in FIG. 1, one or more portions of the sensor system 36 can be located at another device capable of indicating inertial, location, or other information about the user of the wearable audio device 10. For example, in some cases, the sensor system 36 can include an IMU physically housed in a hand-held device such as a pointer, or in another wearable audio device. In particular example implementations, at least one of the sensors in the sensor system 36 can be housed in a wearable audio device distinct from the wearable audio device 10, such as where wearable audio device 10 includes headphones and an IMU is located in a pair of glasses, a watch or other wearable electronic device.

Figure 2:
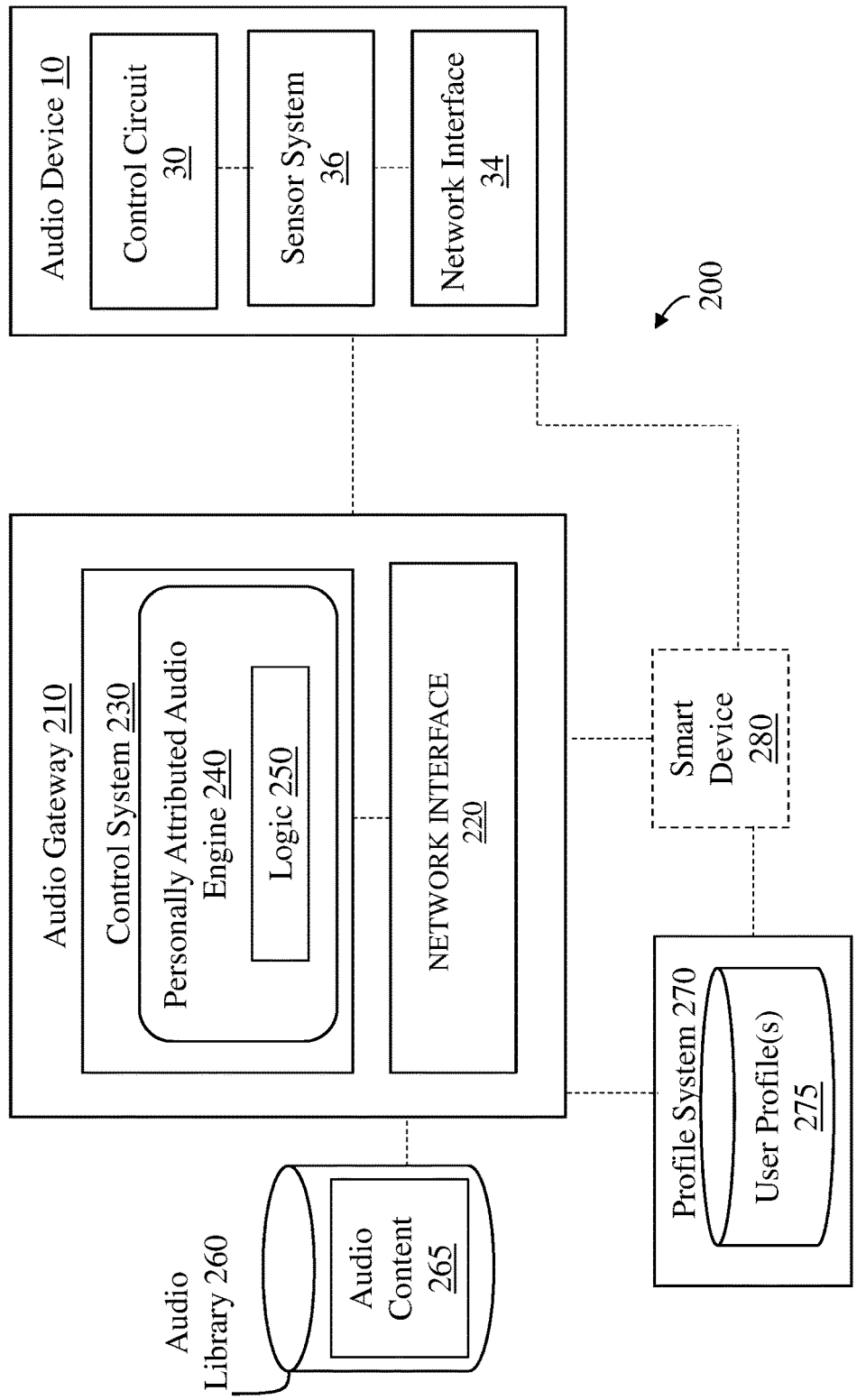
FIG. 2 shows a schematic depiction of data flows in a system including the wearable audio device of FIG. 1, connected with an audio gateway device, according to various implementations.

As described with respect to FIG. 1, control circuit 30 can execute (and in some cases store) instructions for controlling personally attributed audio functions in wearable audio device 10 and/or other audio playback devices in a network of such devices. FIG. 2 shows a schematic depiction of data flows in a system 200 including the wearable audio device (or simply, audio device) 10 connected with an audio gateway device (audio gateway) 210. The audio device 10 and audio gateway 210 can be paired according to any connection described herein, e.g., a wireless connection such as Bluetooth, WiFi or Zigbee. Example configurations of an audio gateway 210 can include a cellular phone, personal data assistant (PDA), tablet, personal computer (PC), wearable communication system, or any other known audio gateway for providing audio content to audio device 10. In particular implementations, the audio gateway 210 includes a network interface 220, which can include similar network interface components as described with reference to the network interface 34 of audio device 10, e.g., a wireless transceiver configured to communicate over any wireless protocol described herein.

Audio gateway 210 can further include a control system 230 configured to execute control functions in the personally attributed audio mode at the audio device 10. The control system 230 can include a microprocessor, memory, and other conventional control hardware/software for executing functions described herein. In some cases, control system 230 can include similar components as those described with respect to control circuit 30 in FIG. 1. In various implementations, control system 230 can have additional processing and/or storage capabilities not present at the control circuit 30 in audio device 10. However, in various implementations, actions performed by control system 230 can be executed at the control circuit 30 on audio device 10 to provide personally attributed audio functions described herein.

In particular implementations, control system 230 includes a personally attributed audio engine 240 or otherwise accesses program code for executing processes performed by personally attributed audio engine 240 (e.g., via network interface 220). Personally attributed audio engine 240 can include logic 250 for executing functions described herein. Both audio gateway 210 and audio device 10 are shown in simplified form in FIG. 2 to focus illustration on functions described according to the personally attributed audio engine 240. Personally attributed audio engine 240 can be configured to implement modifications in audio outputs at the transducer (e.g., speaker) 28 (FIG. 1) at the audio device 10 in response to receiving data indicating that the wearable audio device 10 is proximate an additional wearable audio device (e.g., such as head-worn or body-worn audio device) that is worn by an additional user and is also running a personally attributed audio engine 240. In various particular embodiments, personally attributed audio engine 240 is configured to receive data indicating that the audio device 10 is proximate an additional wearable audio device that is worn by an additional user (which is also running personally attributed audio engine 240), and initiate personally attributed audio playback at the audio device 10 (e.g., at transducer(s) 28 (FIG. 1)) that includes audio playback associated with that additional user. In particular cases, personally attributed audio playback is selected by the additional user (e.g., as a sense of audio "fashion"). In other particular cases, the personally attributed audio playback is selected by the listening user (e.g., the user of the audio device 10), and is based upon a stored categorization of the additional user. In certain cases, the additional wearable audio device includes a plurality of additional audio devices.

FIG. 2 illustrates data flows between components in system 200 (e.g., audio device 10 and audio gateway 210), as well as between those components and additional devices. It is understood that one or more components shown in the data flow diagram may be integrated in the same physical housing, e.g., in the housing of audio device 10, or may reside in one or more separate physical locations.

In particular implementations, the logic 250 in personally attributed audio engine 240 is configured to process sensor data, contextual data, and/or user input data from the audio device 10 and/or additional sources (e.g., smart device 280, profile system 270, etc.) and execute various functions. For example, the personally attributed audio engine 240 is configured to receive proximity data (e.g., geographic proximity data) about the additional wearable audio device relative to the user's audio device 10 (e.g., via communication with one or more cloud-based servers or via device-to-device communication). The personally attributed audio engine 240 running on the audio device 10 and/or the audio gateway 210 is also configured to receive data indicating that the additional audio device is also running a personally attributed audio engine 240. In various implementations, as noted herein, the personally attributed audio engine 240 includes a software application such as a mobile device application that is configured to detect a counterpart application running on a proximate device. That is, the personally attributed audio engine 240 can detect when associated users of the engine are located proximate to one another, and execute various functions described herein.

In response to determining that the additional wearable audio device proximate the user's audio device 10 is running a personally attributed audio engine 240, the personally attributed audio engine 240 running on the audio device 10 and/or the audio gateway 210 can output (e.g., via transducer(s) 28 at audio device 10) personally attributed audio playback to the user according to settings and/or user preferences.

Personally attributed audio engine 240 (including logic 250, related software and/or hardware) can be located at the audio device 10, audio gateway 210 or any other device described herein (e.g., a connected smart device 280). That is, personally attributed audio engine 240 can be configured to execute functions at one or more devices and/or components described herein. In some cases, the personally attributed audio engine 240 may take the form of an entirely hardware implementation, an entirely software implementation (including firmware, resident software, micro-code, etc.) or an implementation combining software and hardware aspects that may all generally be referred to herein as an "engine." Additionally, the personally attributed audio engine 240 may take the form of a computer program product embodied in any tangible medium of expression having computer-usable program code embodied in the medium. In various particular implementations, the personally attributed audio engine 240 executes functions described herein according to logic 250, which can be stored or otherwise accessed by any device capable of performing those functions, e.g., audio gateway 210, audio device 10 or other device(s) described herein.

Personally attributed audio engine 240 can be coupled (e.g., wirelessly and/or via hardwired connections in wearable audio device 10) with an audio library 260, which can include audio content 265 (e.g., audio file(s), playlist(s) of audio files, podcast(s), an audio stream or an Internet radio station, personally attributed audio playback files or audio streams, location-specific audio pins, or one or more audibly presented selections) for playback (e.g., streaming) at audio device 10 and/or a profile system 270 including user profiles 275 about one or more user(s). Audio library 260 can include any library associated with digital audio sources accessible via network interfaces 34 and/or 220 described herein, including locally stored, remotely stored or Internet-based audio libraries. While the audio library 260 and/or profile system 270 can be located at one or more remote devices, e.g., in a cloud-based system or at a remote storage device, it is understood that the audio library 260 and/or the profile system 270 could be integrated in any of the devices shown and described in FIG. 2, e.g., at the audio device 10, audio gateway 210 and/or smart device(s) 280.

In particular implementations, as noted herein, audio content 265 can include any audibly presentable material that can be provided to the user after detecting compatibility with the personally attributed audio settings. As described herein, audio content 265 can include personally attributed audio files or data streams available for playback at the audio device 10, such as music or an audible tone. In some cases, as noted herein, the personally attributed audio playback is variable based upon a context attributed to the audio device 10 and/or the user.

In other cases, the audio content 265 can be presented to the user with one or more associated audio samples, which may include a portion (or all) of the audio content 265, or any other associated audibly presentable material. That is, in certain cases, the term "audio sample" can refer to any audibly presented material associated with audio content 265, and can include a portion of audio content 265, or other audibly presented material altogether, which indicates the source of that content 265. This sample need not be a part of the underlying audio content 265, and may merely serve to identify audio content 265 and/or its source. In some example implementations, when the personally attributed audio engine 240 detects that the user is proximate an additional user running the personally attributed audio engine 240, the personally attributed audio engine 240 running on the audio device 10 provides the user with at least one audio sample of the personally attributed audio playback associated with that additional user. The user can make an interface selection command or other command (e.g., gesture command) to actuate additional functions of the personally attributed audio engine 240, e.g., to initiate playback of the source of audio content 265 associated with the personally attributed audio. In some cases, the personally attributed audio playback or the sample of that personally attributed audio playback is presented in a spatialized manner. Application of spatialized audio functions in particular devices is further described in U.S. patent application Ser. No. 15/908,183, and U.S. patent application Ser. No. 16/179,205, each of which is herein incorporated by reference in its entirety.

User profiles 275 may be user-specific, community-specific, device-specific, location-specific or otherwise associated with a particular entity such as the user. User profiles 275 can include user-defined playlists of digital music files, audio messages stored by the user of audio device 10, or another user, or other audio content available from network audio sources coupled with network interfaces 34 and/or 220, such as network-attached storage (NAS) devices, and/or a DLNA server, which may be accessible to the audio gateway 210 and/or audio device 10 over a local area network such as a wireless (e.g., Wi-Fi) or wired (e.g., Ethernet) home network, as well as Internet music services such as Pandora®, vTuner®, Spotify®, etc., which are accessible to the audio gateway 210 and/or audio device 10 over a wide area network such as the Internet. In some cases, profile system 270 is located in a local server, or a cloud-based server, similar to any such server described herein. User profile 275 may include information about frequently played audio content associated with the user of audio device 10 or other similar users (e.g., those with common audio content listening histories, demographic traits or Internet browsing histories), "liked" or otherwise favored audio content associated with the user or other similar users, frequency with which particular audio content is changed by the user or other similar users, etc. Profile system 270 can be associated with any community of users, e.g., a social network, subscription-based music service (such as a service providing audio library 260), and may include audio preferences, histories, etc. for the user as well as a plurality of other users. In particular implementations, profile system 270 can include user-specific preferences (as profiles 275) for messages and/or related notifications (e.g., prompts, audio overlays). Profiles 275 can be customized according to particular user preferences, or can be shared by users with common attributes.

As shown herein, personally attributed audio engine 240 can also be coupled with a separate smart device 280. The smart device 280 is shown in phantom because it may be a separate component from the device executing the personally attributed audio engine 240, however, it is understood that in various embodiments, the audio gateway 210 is located at a smart device 280 (e.g., a smart phone, smart wearable device, etc.). The personally attributed audio engine 240 can have access to a user profile (e.g., profile 275) or biometric information about the user of audio device 10. In some cases, the personally attributed audio engine 240 directly accesses the user profile and biometric information, however, in other cases, the personally attributed audio engine 240 can access the user profile and/or biometric information via a separate smart device 280. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 280 can include a conventional user interface for permitting interaction with a user, and can include one or more network interfaces for interacting with control circuit 30 and/or control system 230 and other components in audio device 10. However, as noted herein, in some cases the audio gateway 210 is located at a smart device such as the smart device 280. Smart device 280 can further include embedded sensors for measuring biometric information about user, e.g., travel, sleep or exercise patterns; body temperature; heart rate; or pace of gait (e.g., via accelerometer(s)). In various implementations, one or more functions of the personally attributed audio engine 240 can be executed at smart device 280. Further, it is understood that audio gateway 210 can include any manner of smart device described herein.

As described herein, personally attributed audio engine 240 is configured to receive sensor data about one or more conditions at the audio device 10 from sensor system 36. In various particular implementations, the sensor system 36 can include an IMU for providing inertial information about the audio device 10 to the personally attributed audio engine 240. In various implementations, this inertial information can include orientation, translation and heading. For example, inertial information can include changes in heading (e.g., from an absolute value relative to magnetic north), changes in orientation (e.g., roll, pitch, yaw), and absolute translation (e.g., changes in x-direction, y-direction, z-direction). Additionally, inertial information can include first and second derivatives (i.e., velocity and acceleration) of these parameters. In particular examples, the personally attributed audio engine 240, including logic 250, is configured to calculate spatially rendered audio locations proximate the audio device for audio output using inputs such as audio pin angle, IMU azimuth angle and persistent azimuth, as described in U.S. patent application Ser. No. 15/908,183, which is herein incorporated by reference in its entirety.

In additional implementations, sensor system 36 can include additional sensors for detecting conditions at the audio device, for example: a position tracking system; and a microphone (e.g., including one or more microphones). These sensors are merely examples of sensor types that may be employed according to various implementations. It is further understood that sensor system 36 can deploy these sensors in distinct locations and distinct sub-components in order to detect particular environmental information relevant to user of audio device 10.

In certain cases, the position tracking system can include one or more location-based detection systems such as a global positioning system (GPS) location system, a Wi-Fi location system, an infra-red (IR) location system, a Bluetooth beacon system, etc. In various additional implementations, the position tracking system can include an orientation tracking system for tracking the orientation of the user and/or the audio device 10. In this sense, the IMU may form part of the position tracking system. However, in other implementations, orientation tracking can be performed via other components in the position tracking system, e.g., a separate head-tracking or body-tracking system (e.g., an optical-based tracking system, accelerometer, magnetometer, gyroscope or radar) for detecting a direction in which the user is facing, as well as movement of the user and the audio device 10. The position tracking system can be configured to detect changes in the physical location of the audio device 10 and/or the user (where the user is separated from audio device 10) and provide updated sensor data to the personally attributed audio engine 240 in order to indicate a change in the location of the user. The position tracking system can also be configured to detect the orientation of the user, e.g., a direction of the user's head (e.g., where the user is looking), or a change in the user's orientation such as a turning of the torso or an about-face movement. In these examples, the IMU at audio device 10 may be particularly useful in detecting changes in user orientation. However, it is understood that the position tracking system could also include one or more optical or visual detection systems (e.g., camera(s)) located at the audio device 10 or another device (e.g., the audio gateway 210 and/or smart device 280) configured to detect the orientation of the user.

In some example implementations, this position tracking system (e.g., IMU) can detect that the user has changed his/her look direction, that is, the orientation of his/her head, and can send that sensor data (e.g., inertial information) to the personally attributed audio engine 240. In particular example implementations, the position tracking system can utilize one or more location systems and/or orientation systems to determine the location and/or orientation of the user, e.g., relying upon a GPS location system for general location information and an IR location system for more precise location information, while utilizing a head or body-tracking system such as the IMU to detect a direction of the user's viewpoint (also referred to as the look direction). In any case, the position tracking system can provide sensor data to the personally attributed audio engine 240 about the position (e.g., location and/or orientation) of the user so that the personally attributed audio engine 240.

In some cases, the IMU, which can include an accelerometer/gyroscope/magnetometer, can include distinct accelerometer components gyroscope components and/or magnetometer components, or could be collectively housed in a single sensor component. This component may be used to sense gestures based on movement of the user's body (e.g., head, torso, limbs) while the user is wearing the audio device 10 or interacting with another device (e.g., smart device 280) connected with audio device 10. As with any sensor in sensor system 36, accelerometer(s)/gyroscope(s)/magnetometer(s) may be housed within audio device 10 or in another device connected to the audio device 10. In some example implementations, the accelerometer(s)/gyroscope(s)/magnetometer(s) can detect inertial information about the user, e.g., an acceleration of the user and/or audio device 10 or a deceleration of the user and/or audio device 10.

The microphone (which can include one or more microphones, or a microphone array) in sensor system 36 can have similar functionality as the microphone(s) 18 and 24 shown and described with respect to FIG. 1, and may be housed within audio device 10 or in another device connected to the audio device 10. Microphone(s) can be positioned to receive ambient acoustic signals (e.g., acoustic signals proximate audio device 10) or acoustic signals within audio device 10 (e.g., acoustic signals near a wearer's ear canal). In some cases, ambient acoustic signals include speech/voice input from the user to enable voice control functionality. In some other example implementations, the microphone(s) can detect the voice of the user of audio device 10 and/or of other users proximate to or interacting with the user. In particular implementations, personally attributed audio engine 240 is configured to analyze one or more voice commands from user (via microphone(s)), and modify the audio output at the audio device 10 (e.g., via transducer(s) 28) based upon that command. In these cases, logic 250 can include logic for analyzing voice commands, including, e.g., natural language processing (NLP) logic or other similar logic.

It is understood that any number of additional sensors can be incorporated in sensor system 36, and can include temperature sensors or humidity sensors for detecting changes in weather within environments, physiological sensors for detecting physiological conditions of the user (e.g., one or more biometric sensors such as a heart rate sensor, a photoplethysmogram (PPG), electroencephalogram (EEG), electrocardiogram (ECG) or EGO) optical/laser-based sensors and/or vision systems for tracking movement or speed, light sensors for detecting time of day, additional audio sensors (e.g., microphones) for detecting human or other user speech or ambient noise, etc.

In additional implementations, the personally attributed audio engine 240 can alternatively (or additionally) be configured to implement modifications in audio outputs at the transducer (e.g., speaker) 28 (FIG. 1) at audio device 10 in response to receiving additional information from audio device 10 or another connected device such as smart device 280 and/or audio gateway 210. For example, a Bluetooth beacon (e.g., BLE beacon) trigger, GPS location trigger or timer/alarm mechanism can be used to initiate functions of the personally attributed audio engine 240 at audio device 10. These triggers and mechanisms can be used in conjunction with other actuation mechanisms described herein (e.g., voice actuation, gesture actuation, tactile actuation) to initiate functions of the personally attributed audio engine 240. In some cases, functions of the personally attributed audio engine 240 can be initiated based upon proximity to a detected BLE beacon or GPS location. In other cases, functions of the personally attributed audio engine 240 can be initiated based upon a timing mechanism, such as at particular times or intervals.

However, in still other cases, the user can save a default setting or the audio device 10 can have an original device setting that enables functions of the personally attributed audio engine 240 without requiring a trigger from another device and/or sensor. According to these implementations, the personally attributed audio engine 240 is configured to initiate functions of the personally attributed audio engine 240 without requiring additional input information, such as sensor information or device input(s).

As additionally noted herein, the personally attributed audio engine 240 can be configured to detect or otherwise retrieve contextual data about the user and/or usage of the audio device 10. For example, the personally attributed audio engine 240 can be configured to retrieve contextual data from one or more applications running at the audio gateway 210 and/or the audio device 10, such as a calendar or organizational application, e-mail or messaging application, etc. The personally attributed audio engine 240 can also be configured to detect that the user is engaging one or more device functions, for example, that the user is on a phone call or actively sending/receiving messages with another user using the audio gateway 210.

As noted herein, in various implementations, the personally attributed audio playback (sourced from audio content 265) can be settings-specific, location-specific, context-specific, specifically tailored to a stored categorization of a user (e.g., a stored categorization of the additional user), or selected by one or more users (e.g., selected by the additional user(s)). For example, in some cases each user can designate his/her own personally attributed audio playback, e.g., such as a "theme" song or playback that reflects the user's mood at the time (e.g., an upbeat pop song corresponding with a good mood or a light classical song corresponding with a contemplative mood). In these cases, when a subject (or, first) user (running the personally attributed audio engine 240) enters the proximity of a listening (or, second) user (also running the personally attributed audio engine 240), the control system 230 at the second user's audio device 10 can initiate the personally attributed audio playback for the listening user as designated by the subject user.

In other examples, the personally attributed audio playback is designated by the listening user (second user) based upon the categorization of the first user (subject user). That is, the listening user (or, second user) can designate permissions and/or settings that can be accessible through the logic 250 in the personally attributed audio engine 240 and/or stored in the user profile(s) 275 in the profile system 270 (FIG. 2). For example, the listening user may permit (via settings/permissions) personally attributed audio playback from one or more selected subject users or one or more groups of subject users (e.g., labelled groups such as "friends", "relatives", "co-workers", "celebrities"). Additionally the listening user can designate primacy or other ranking(s) for one or more subject users or groups of subject users to enable those subject user's personally attributed audio playback instead of other subject users within the defined proximity.

It is understood that in various implementations, the listening user must permit the personally attributed audio playback from the subject user in order for the personally attributed audio engine 240 to initiate playback at the audio device 10. In these cases, the listening user can designate circumstances where personally attributed audio playback interrupts or mixes with current (primary) audio playback, or can designate one or more subject users or groups of subject users that have permissions to trigger the personally attributed audio playback at the audio device 10. In various implementations, these permissions are saved in the profile system 270, coded in logic 250 or otherwise accessible to the control system 230 to allow seamless transitions between playback without unnecessary user prompts and corresponding actuation.

In some cases, the personally attributed audio playback is variable based upon a context attributed to the audio device 10. In some cases, the contextual data can be pulled from sensor data (e.g., from sensor system 36) or from one or more additional applications running on the audio gateway 210 and/or the smart device 280. For example, contextual data can include weather data indicating that it is raining or sunny at the user's current location. Additionally, contextual data can include social networking status indicator data, such as whether the user has designated his/her status as "happy" or "sad." Additionally, contextual data can include location-based information (e.g., GPS data, ambient sound pressure level data, etc.) such as an indicator that the user is at a party or at the grocery store. Contextual data can also include date and/or time information, such as information about days of the week, holidays, special events or birthdays, along with information about time of day, scheduled events, etc. In some cases, the personally attributed audio engine 240 is configured to set or adjust the user's personally attributed audio playback according to one or more contextual data cues received via other applications running on the audio gateway 210 and/or smart device 280, data gathered from the sensor system 36 and/or data gathered by sensors on the smart device 280.

Figure 3:
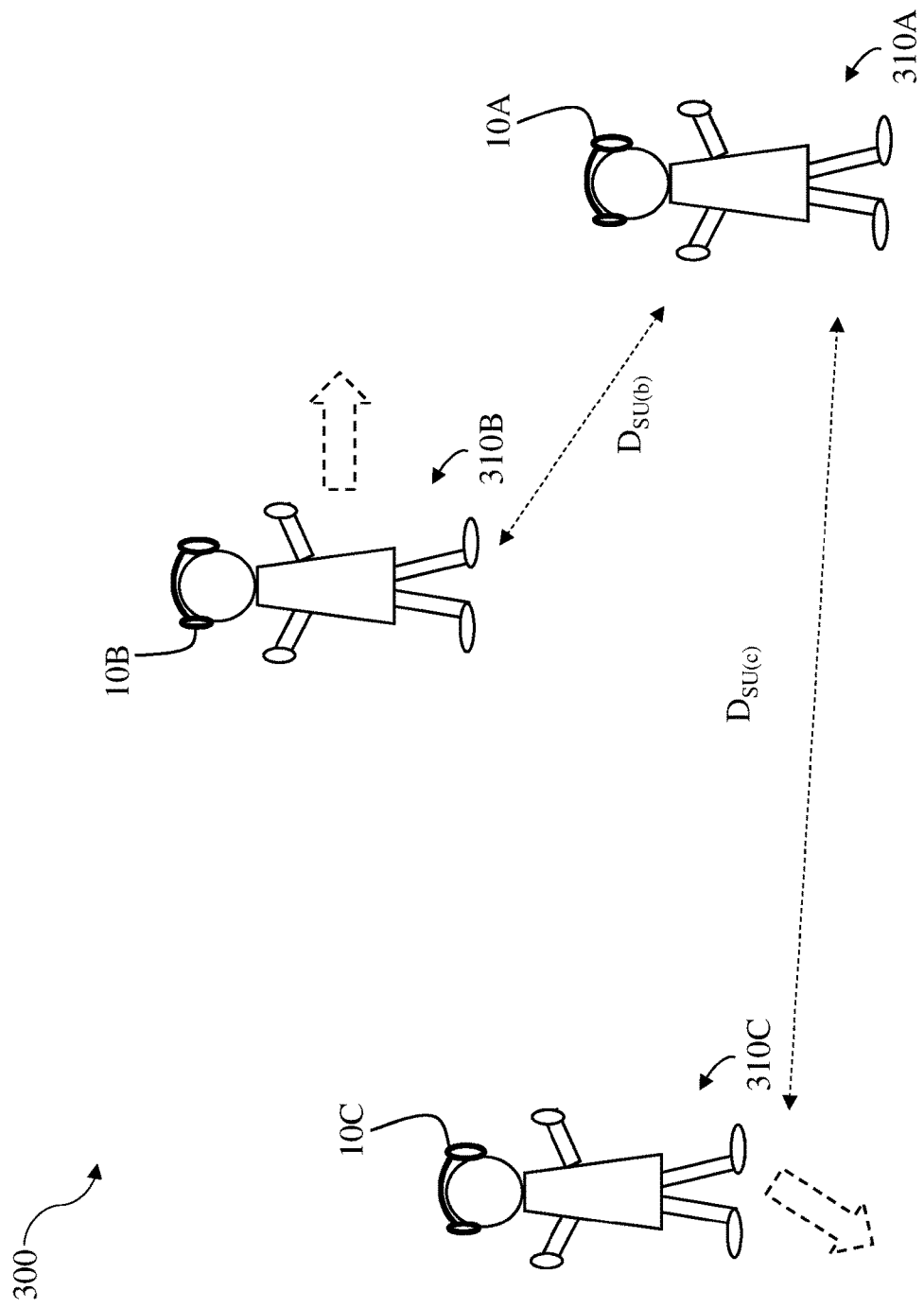
FIG. 3 shows a schematic depiction of an environment including a plurality of users interacting with one another using a personally attributed audio engine, according to various implementations.

FIG. 3 shows an example environment 300 including a plurality of users 310 (shown as users 310A, 310B, and 310C) each wearing an audio device 10A, 10B, 10C, similar to the audio device 10 shown and described with reference to FIGS. 1 and 2. The listening user is designated as 310A, while the subject users are designated as 310B and 310C, respectively. In this example, each of the subject users 310B, 310C are considered within the defined proximity of the listening user 310A. As described herein, this proximity can be defined in terms of physical (e.g., geographic) distance between audio device 10A and audio devices 10B and 10C, respectively. In particular implementations, the personally attributed audio engine 240 can limit proximity settings to a distance that is approximately within a user's field of vision, e.g., within several hundred feet (or a couple hundred meters). In more particular implementations, proximity is defined as a distance within dozens of feet. In the example of FIG. 3, subject users 310B, 310C can be considered within 50-100 feet of the listening user 310. In this example, the subject user 310B is closer to listening user 310A (e.g., within distance $D_{SU(b)}$) than subject user 310C (e.g., within distance $D_{SU(c)}$).

The personally attributed audio engine 240 can be configured to determine the proximity of the plurality of audio devices 10B, 10C relative to audio device 10A according to various approaches. In one example, proximity can be determined using device-to-device connections such as Bluetooth or Bluetooth Low Energy (BLE) ranges, network-based proximity (e.g., where audio devices 10A, 10B and 10C are on the same Wi-Fi or Zigbee network), cellular mobile communications connections (e.g., fourth generation (4G) or fifth generation (5G) connections), etc.

Figure 4:
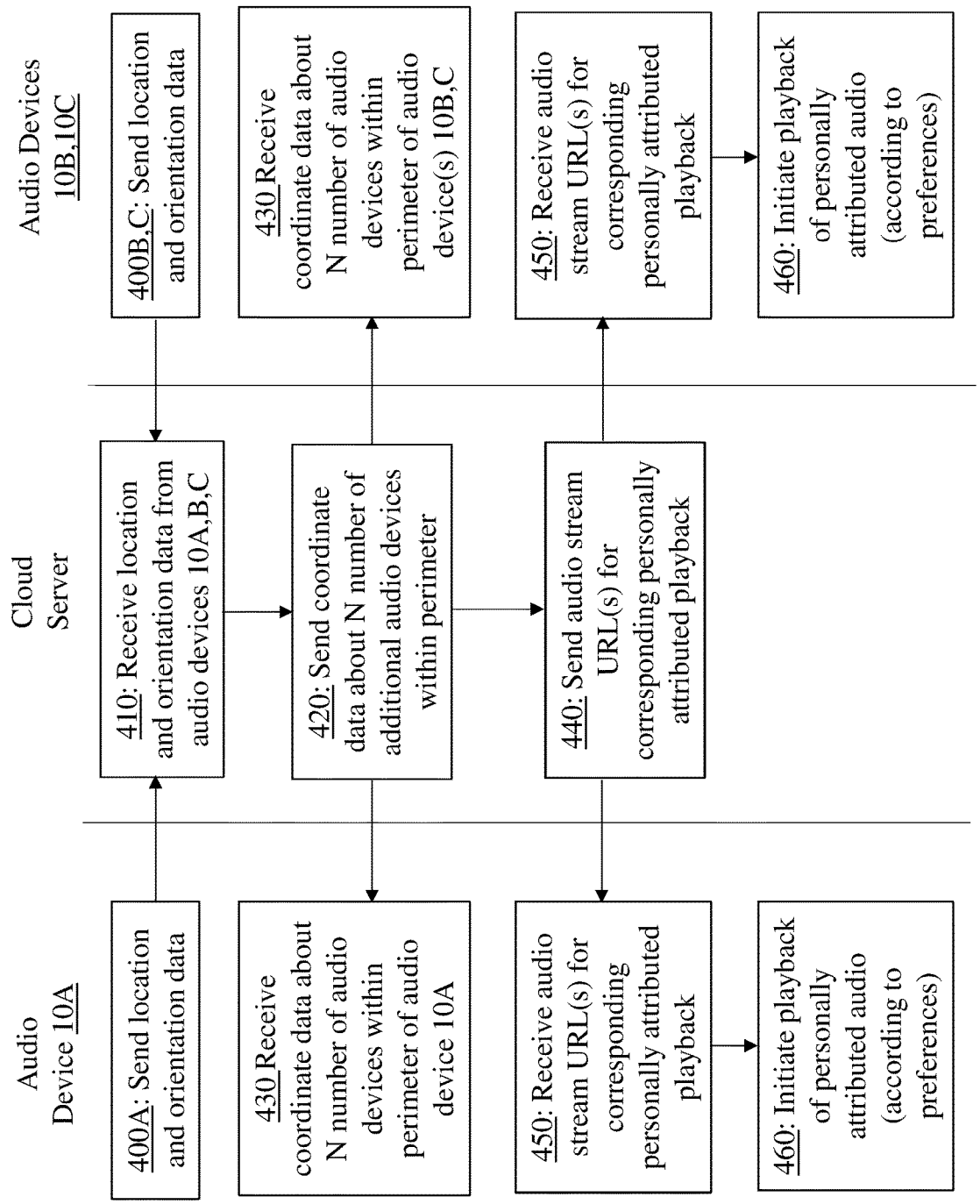
FIG. 4 is a swim lane diagram illustrating one approach for rendering personally attributed audio content at a wearable audio device according to various additional implementations.

In still other cases, the personally attributed audio engine 240 can determine the proximity of the plurality of audio devices 10B, 10C relative to audio device 10A using GPS data. In some particular cases, the personally attributed audio engine 240 can determine the proximity of the plurality of audio devices 10B, 10C relative to audio device 10A using a cloud-based server, e.g., a server managing the personally attributed audio engine 240. FIG. 4 shows a swim lane diagram illustrating processes performed by the personally attributed audio engine 240 running on each of the plurality of audio devices 10A, 10B, 10C, as they communicate with the cloud-based server (cloud server) managing the personally attributed audio engine 240. These processes are described with respect to distinct interactions between audio devices 10A, 10B, 10C relative to the cloud server running the personally attributed audio engine 240. In particular, FIG. 4 shows interaction between the listening user's audio device 10A and the cloud server, as well as the separate interaction between respective subject users' audio devices 10B and 10C with the cloud server. For simplicity of illustration, the subject users' audio devices 10B, 10C are shown in a single lane within the swim lane diagram, although it is understood that each of the subject users' audio devices 10B, 10C independently communicates with the cloud server according to the processes described herein.

Turning to FIG. 4, in process 400, the personally attributed audio engine 240 running at each audio device 10 (or audio gateway 210, as noted herein) sends location and orientation data to the personally attributed audio engine 240 running at the cloud server. In various implementations, the personally attributed audio engine 240 can send data from one or more sensor systems (e.g., GPS data, IMU data, etc.) about the location of the audio device 10 and the orientation of the audio device 10. Location data can include, for example, GPS coordinate data, Wi-Fi location (or other network location) data, or data from any other sensor in sensor system 36 that is indicative of the physical location of the audio device 10. The orientation data can include information about the user's look direction (e.g., data gathered from the sensor system 36, such as the IMU or other head motion sensor, camera, etc.), which can include eye tracking data and/or data indicating the relative orientation of the audio device 10 (e.g., the front orientation of a set of headphones, earphones or audio glasses). The personally attributed audio engine 240 running at the cloud server may maintain (or otherwise access) a database with identification for each of the users that have enrolled or otherwise subscribed with the personally attributed audio engine 240 (e.g., downloaded the program on his/her audio device 10 and/or audio gateway 210).

The cloud server (running the personally attributed audio engine 240) is configured to receive the location and orientation data from the personally attributed audio engine 240 running at the user's audio device 10 and/or audio gateway 210 (process 410). In various implementations, the audio devices 10 (and/or audio gateways 210) communicate with the cloud server using a cellular data network, Wi-Fi network and/or wide area network (WAN) or local area network (LAN) connected with the internet.

In response to receiving the location and orientation data from the audio devices 10 (and/or associated audio gateways 210), the personally attributed audio engine 240 running at the cloud server is configured to verify whether one or more additional audio devices (e.g., audio devices 10B, 10C) are located within the designated perimeter of the listening user's audio device (e.g., audio device 10A). As noted herein, the perimeter can be defined by user settings, e.g., stored in the personally attributed audio engine 240 and/or in the profile system 270 (FIG. 2). In some examples, the perimeter is defined in terms of geographic distance (range). In the example shown in FIG. 3, the perimeter associated with user 310A is greater than the distance $D_{SU(C)}$, such that both users 310B and 310C are within the perimeter for personally attributed playback with user 310A.

Once the personally attributed audio engine 240 running at the cloud server verifies that at least one additional user (e.g., user 310B, 310C) is located within the perimeter for the listening user (e.g., user 310A), the personally attributed audio engine 240 running at the cloud server sends coordinate data about each of the audio devices 10B, 10C associated with those users within the perimeter (process 420). The audio device 10 (and/or audio gateway 210) is then configured to receive the coordinate data sent from the personally attributed audio engine 240 running at the cloud server (process 430).

In various additional implementations, the personally attributed audio engine 240 running at the cloud server also sends audio stream uniform resource locator(s) (URLs) for corresponding personally attributed playback to the audio device (and/or audio gateway), e.g., audio device 10A (process 440). In particular implementations, the personally attributed audio engine 240 also sends location and/or orientation data for each URL, e.g., along with the URL or in a separate data packet. The audio stream URLs (and in some cases, the location and/or orientation data associated with URLs) are received by the audio device 10 (and/or audio gateway 210) (process 450), and can be transmitted by the cloud server along with, or nearly contemporaneously with, the coordinate data about the N number of additional audio devices within the perimeter (described with reference to process 420).

After receiving the audio stream URLs, the personally attributed audio engine 240 running at the audio device 10 and/or audio gateway 210 can be configured to initiate playback of the personally attributed audio at the listening user's audio device 10 according to that user's preferences (process 460). In various implementations, the audio device 10 is configured to access the personally attributed audio playback with the corresponding URL for the subject (additional) user, or a plurality of subject (additional) users, according to the user preferences.

Returning to the example depiction in FIG. 3, in various implementations, the personally attributed audio engine 240 running at the audio device 10 and/or audio gateway 210 is configured to receive data indicating that the audio device 10 is proximate a plurality of users (e.g., users 310B, 310C) that are running the attributed audio engine 240 at their corresponding audio devices 10 and/or audio gateways 210. In response to receiving this proximity data, the personally attributed audio engine 240 running at the audio device 10 and/or audio gateway 210 of the listening user 310A is configured to initiate the personally attributed audio playback from one or both of the additional users 310B, 301C.

In particular cases, the personally attributed audio playback from the first subject user 310B is mixed with the personally attributed audio playback from the second subject user 310C at the audio device 10A. In certain examples, the audio stream URLs associated with each user 310B, 310C can be mixed according to perimeter size (also referred to as proximity range), such that any one audio stream can only be heard from a defined distance (e.g., x number of feet or meters) in any direction. This configuration can help to limit the number of possible audio streams in a crowded location. In certain cases, proximity range can be further defined based upon the user's look direction, such that a first proximity range is applied to the user's current look direction while a second (lesser) proximity range is applied to the other directions relative to the user (e.g., behind the user). In particular cases, the personally attributed audio engine 240 can mix up to four (4) audio streams simultaneously, e.g., using spatialization, directionality and/or distance to provide distinct playback features.

In certain cases, the personally attributed audio playback from a primary subject user (e.g., subject user 310B) is played back prior to the personally attributed audio playback from a secondary subject user (e.g., subject user 310C), such that the playback from user 310C is mixed with already rendered playback from user 310B. This mixing approach can be performed, for example, according to relative priority of the subject users. In some cases, relative priority between the subject users (e.g., users 310B, 310C) is based upon one or more factors, such as: a geographic proximity of the audio device 10B and the geographic proximity of audio device 10C to the audio device 10A, a social graph including social connections between the listening user 310A and at least one of the subject users 310B or 310C, or a commonality of interests in audio content between the listening user 310A and at least one of the and at least one of the subject users 310B or 310C.

For example, priority based upon geographic proximity can include mixing the secondary user's personally attributed audio playback with the primary subject user's 310B personally attributed audio playback when the secondary subject user 310C reaches a threshold geographic proximity relative to the listening user 310A. Priority mixing based upon geographic proximity can be further adjusted using spatialized and/or directional audio playback. For example, mixing can be performed in a spatialized and/or directional manner, such that a secondary subject user's personally attributed audio playback is mixed with the primary subject user's personally attributed audio playback to reflect that secondary user's direction of approach. In particular examples, the secondary user's personally attributed audio playback appears to originate from that secondary user's direction of approach, and is mixed from that direction, such that the exiting audio playback (from primary subject user 310B) appears to mix out of the user's range from the opposite direction. In still further cases, the secondary user's personally attributed audio playback can be spatialized to reflect proximity using outward to inward audio mixing, such that the secondary user's personally attributed audio playback initially appears as though it originates from around the user, but at a greater radial distance than the primary subject user's personally attributed audio playback. The secondary user's personally attributed audio playback is then mixed with the primary subject user's personally attributed audio playback as though approaching from one or more sides, until the primary subject user's personally attributed audio playback mixes out (e.g., radially inward to radially outward).

In other examples, priority can be based upon a social graph such as a social networking relationship between the listening user 310A and one or more of the subject users 310B or 310C. For example, the personally attributed audio playback from a subject user (e.g., user 310B) can be given priority over personally attributed audio playback from an additional subject user (e.g., user 310C) where user 310B has a status in a social graph that includes the listening user 310A (e.g., as accessible via the profile system 270 or any other software application running on the audio gateway 210) and user 310C either does not have a status in that social graph, or has a lesser status in that social graph.

In still other examples, priority can be based upon a commonality of interests in audio content (e.g., music, audio books, podcasts, etc.) between the listening user 310A and one or more of the subject users 310B or 310C. For example, the personally attributed audio playback from a subject user (e.g., user 310B) can be given priority over personally attributed audio playback from an additional subject user (e.g., user 310C) where user 310B has a commonality in audio content interests with the listening user 310A (e.g., as accessible via the profile system 270 or any other software application running on the audio gateway 210 (FIG. 2)) and user 310C either does not have a commonality in any interests with that listening user 310A, or has a lesser commonality in interests with the listening user 310A. In some cases, the personally attributed audio engine 240 is configured to check audio content interests in the profile 275 of the listening user 310A against the audio content interests in the profile 275 of the subject user(s) 310B, 310C, and where a commonality of audio content interests exists, assign priority to the user with the highest level of commonality relative to the other subject users within the geographic proximity permitting audio playback.

In some additional implementations, with continuing reference to FIGS. 2 and 3, the personally attributed audio playback is output at the audio device 10 in a spatially rendered audio location based upon a location of the additional (subject) user. That is, using FIG. 3 as an example, the personally attributed audio playback attributed to users 310B and 310C can be output in distinct spatially rendered audio locations at audio device 10A. In various implementations, the personally attributed audio playback is output in a spatially rendered audio location that is defined relative to the user's look direction and/or relative to a physical location proximate the user. For example, the personally attributed audio playback can include audio playback that appears to originate from a location in three-dimensional space in front of the user, behind of the user, at the periphery of the user, above or below the user, or any location in between. In some cases, personally attributed audio playback associated with each distinct user (e.g., subject users 310B, 310C) within the proximity range is spatially rendered in distinct locations at the audio device (e.g., audio device 10A) based upon the orientation of those users relative to the listening user (e.g., user 310A). In the example shown in FIG. 3, the personally attributed audio playback of user 310C can appear to originate in a generally westward direction at the audio device 10A, while the personally attributed audio playback of user 310B can appear to originate in a generally northwestward direction at the audio device 10A.

Additionally, the spatially rendered audio location of the personally attributed audio playback can be adjusted based upon detected movement of the subject user(s) 310B, 310C relative to the listening user 310A (FIG. 3). In the example shown in FIG. 3, movement of each of the subject users 310B, 310C is illustrated by block arrows. As these subject users 310B, 310C move, the spatially rendered audio location of their personally attributed audio playback is adjusted, e.g., such that the personally attributed audio playback of user 310B appears to move approximately eastward and the personally attributed audio playback of user 310C appears to move approximately southwestward.

In some implementations, the personally attributed audio engine 240 is configured to compare the spatially rendered audio location of the personally attributed audio playback with data indicating the look direction of the user 310 (e.g., data gathered from the sensor system 36, such as the IMU, camera, etc.). This comparison can be performed on a continuous or periodic basis. In some cases, in response to detecting a change in the look direction of the user 310 (e.g., with data from sensor system 36), the personally attributed audio engine 240 is configured to update the spatially rendered audio location of the personally attributed audio playback.

In some particular cases, the spatially rendered audio location of the personally attributed audio playback is calculated using a head related transfer function (HRTF). One example technique for spatializing audio is described in U.S. patent application Ser. No. 15/945,449, filed Apr. 4, 2018, titled "Systems and Methods for Sound Externalization Over Headphones", which is incorporated herein by reference in its entirety. While example implementations described herein relate to head tracking, with particular emphasis on look direction, it is understood that additional alternative implementations can employ eye tracking (e.g., via an eye tracker in sensor system 36) to permit selection of look directions (or corresponding zones) via eye movement. In these cases, the user 310 can move his/her eyes between spatially delineated look directions (which may be calibrated for eye-tracking actuation), and personally attributed audio engine 240 will update the location of the personally attributed audio playback as described herein.

In some additional implementations, the user (e.g., listening user) 310 (FIG. 3) can provide feedback about the personally attributed audio playback, e.g., via the audio device 10 (or another device including the audio gateway 210) and/or the smart device 280 (FIG. 2). In some cases, the personally attributed audio engine 240 is configured to receive feedback in the form of a request for additional information about the personally attributed audio playback, a judgment score about the personally attributed audio playback and/or a request to mimic the personally attributed audio playback.

In the case that the feedback from the user 310 includes a request for additional information about the personally attributed audio playback, the personally attributed audio engine 240 is configured to provide additional audio playback (e.g., at the audio device 10) that includes a description of the personally attributed audio playback. For example, where the personally attributed audio playback includes a song, the additional audio playback can include information about the artist and/or title of that song. In some cases, the additional audio playback can be played as a separate file or stream and can interrupt the personally attributed audio playback. However, in other cases, the additional audio playback can include an audio stream or file that is overlayed with the personally attributed audio playback, or is faded in/out with the personally attributed audio playback.

In the case that the feedback from the user 310 includes a judgment score, the personally attributed audio engine 240 is configured to send a signal to the additional audio device (e.g., audio device(s) 10B, 10C, FIG. 3) or to an audio gateway 210 or the cloud server indicating the judgment score from the user (e.g., user 10A, FIG. 3). This can include a "like" or "dislike" score, or another indicator of the user's opinion of the personally attributed audio playback.

In the case that the feedback from the user 310 includes a request to mimic the personally attributed audio playback, the personally attributed audio engine 240 is configured to adjust audio playback at the listening user's audio device (e.g., audio device 10A (FIG. 3)) to match the personally attributed audio playback of the additional user (e.g., subject user 310B or 310C). In this example, the user 310A may like the song that is being played in the personally attributed audio playback from subject user 310B, and may wish to listen to that song on his/her audio device 10A. In this case, the user 310A can provide feedback in the form of a request to mimic that personally attributed audio playback. In some cases, the personally attributed audio engine 240 can send this feedback to the cloud-based server, and in response to receiving that feedback, the personally attributed audio engine 240 running at the cloud-based server can send the audio stream URL(s) associated with that personally attributed audio playback from the additional user 310B to the audio device 10A of user 310A (or the audio gateway 210 and/or smart device 280) for rendering and playback.

In certain additional implementations, a user (e.g., user 310A, FIG. 3) may already be listing to a primary audio output at his/her audio device (e.g., audio device 10A) when one or more additional users (e.g., users 310B, 310C) enter the geographic proximity that can trigger personally attributed audio playback. For example, the user may be listening to music, an audio book or a podcast prior to the arrival of the additional user(s) in the vicinity. In these cases when primary audio output is provided at the audio device and the personally attributed audio playback is initiated (e.g., when user preferences or settings in the user profile 275 (FIG. 2) permit personally attributed audio playback from a proximate additional user), the personally attributed audio engine 240 can be configured to perform additional actions, including: a) pausing the primary audio output while providing the personally attributed audio playback at the audio device 10, b) reducing a volume of the primary audio output while providing the personally attributed audio playback at the audio device 10, or c) mixing the primary audio output with the personally attributed audio playback at the audio device 10. In scenario (a), the personally attributed audio engine 240 pauses the playback of the primary audio output either prior to initiating the personally attributed audio playback or contemporaneously with initiating the personally attributed audio playback. This can include pausing playback of the audio file or streaming of the audio stream (e.g., audio content 265) that is the source of the primary audio output. In scenario (b), the personally attributed audio engine 240 reduces the volume of the primary audio output but continues to render that output while providing the personally attributed audio playback, e.g., at a higher volume than the primary audio output. In scenario (c), the personally attributed audio engine 240 mixes the primary audio output with the personally attributed audio playback, e.g., by mixing the personally attributed audio playback in with the already playing primary audio output.

As noted herein, the personally attributed audio engine 240 can be configured to manage personally attributed audio playback from one or more additional audio devices 10 within a proximity of the listening user's audio device 10 in real time. Additionally, the personally attributed audio engine 240 can be configured to manage personally attributed audio playback over a period, or in historical terms. For example, in some implementations, the personally attributed audio engine 240 is further configured to provide a report including a listing of the personally attributed audio playback for each of the audio devices (e.g., audio devices 10B, 10C, FIG. 3) that have entered the proximity of the audio device (e.g., audio device 10A) during a period. In these cases, the listening user (e.g., user 310A) is provided with a report that includes a listing of the personally attributed audio playback that was selected by one or more additional users that "passed" the listening user within a given period. In certain cases, the user's preferences will have prevented much of this personally attributed audio playback from being output (e.g., rendered) at his/her audio device 10 in real time. For example, a user that walks to work in a metropolitan area while listening to his/her audio device 10 could pass within the defined proximity of dozens or hundreds of other users running the personally attributed audio engine 240 on their audio devices 10. The personally attributed audio engine 240 may have settings, or the user may have established preferences, that limit a number of times personally attributed audio playback can be initiated at the listening user's audio device 10, or limit the network of additional users whose personally attributed audio content can be rendered in real time at the listening user's audio device 10. However, the listening user may be interested to know what these other users selected as their personally attributed audio content. In these cases, the user can actuate an interface command (e.g., via the audio gateway 210 and/or smart device 280 (FIG. 2)) to request a report that includes a listing of the personally attributed audio playback for each of the audio devices that have entered the proximity of the user's audio device during a period. For example, the user may wish to see a report of the personally attributed audio playback of those additional users that passed through his/her vicinity within a given day, week, month, etc. In some cases, the report can include active links or otherwise be actuatable to allow the user to select the personally attributed audio content and play that content back at one or more audio devices at a later time.

In still further implementations, the personally attributed audio engine 240 can be configured to manage personally attributed audio playback based upon location and time. For example, in response to the user (e.g., user 310A, FIG. 3) entering a geographic location (e.g., environment 300), the personally attributed audio engine 240 can prompt the user to initiate playback of the personally attributed audio playback for at least one additional user's wearable audio device that has entered that geographic location within a period. In this case, the user can listen to the personally attributed audio playback of other users that have passed through that geographic location (e.g., within a geographic range of a location, such as a notable landmark or an intersection) over a period. These additional users need not be in the listening user's proximity at the time in order to trigger this prompt. That is, the personally attributed audio engine 240 can detect (e.g., via location information from sensor system 36) that the listening user 310A has entered a geographic location where other users of the personally attributed audio engine 240 have passed within a given period (e.g., within the last hour, or the last day, as dictated by user preferences or settings such as those saved in user profiles 275 (FIG. 2)). If this operating mode is enabled, the personally attributed audio engine 240 prompts the user to initiate playback of the personally attributed audio content of one or more of these additional users. The user can actuate the prompt to initiate playback of this personally attributed audio content in any format described herein. In some cases, similarly to the historical playback configuration, the user is provided with a listing or a report of the personally attributed audio playback of the other users that have passed through that location within the defined period. In these cases, the user can select one or more playback options from the listing to initiate playback.

As described herein, user commands can take any form capable of detection at the audio device 10, audio gateway 210 and/or smart device 280. For example, user commands can include a tactile actuation, gesture actuation or a voice command received at the audio device 10 or at another device such as the audio gateway 210 or the smart device 280 (e.g., via sensor system(s) described herein). In particular cases, the user can initiate operation of the personally attributed audio engine 240, or initiate the personally attributed audio playback of another user by speaking a command such as: "Play personally attributed audio," or "Play audio fashion." In other cases, the user can initiate one or more operating modes with a tactile cue such as a tap or multi-tap actuation at the audio device 10, audio gateway 210 and/or smart device 280. In particular implementations, the tactile actuation can include a double-tap or triple-tap on any portion of the audio device 10, or on a particular interface at the audio device 10 (e.g., a capacitive touch interface). However, the user can also actuate the one or more operating modes using a tactile command (e.g., touch and pause command, tap command, swipe command) on the smart device 280, e.g., where smart device 280 includes a watch or other wearable device. In other cases, the user can initiate the one or more operating modes with a gestural cue, such as a deep head nod, a look in a particular direction, or a look-and-pause command, which can be detected at the audio device 10 (e.g., via an IMU) or at the audio gateway 210 and/or smart device 280 (e.g., with optical sensors or proximity sensors).

In some cases, the audio gateway 210 (FIG. 2) can also include an interface permitting the user to deliver an initiation command, such as a touch-screen command or push-button command. However, in some particular implementations, the user can initiate one or more operating modes (e.g., personally attributed audio playback mode) without contacting a user interface on the audio gateway 210 (e.g., without taking a smart device 280 out of his/her pocket). In still further implementations, the user can initiate the personally attributed audio playback mode using a gesture, such as a gesture detectable at the audio device 10 and/or smart device 280. For example, the user can initiate the personally attributed audio playback mode using a head nod or twist, in the case that the audio device 10 and/or smart device 280 includes a head tracking system. In other examples, the user can initiate the personally attributed audio playback mode using a wrist rotation or arm wave, using an IMU or other accelerometer(s)/gyroscope(s)/magnetometer(s) at the audio device 10 and/or smart device 280. Gesture and/or voice commands can be beneficial for users who want to limit interaction with visual interfaces such as screens. In any case, the user can initiate the personally attributed audio playback mode using one or more connected devices.

Returning to FIG. 2, in some cases, user settings (e.g., settings in user profile(s) 275) or default settings can be used by logic 250 to control functions based upon feedback from the user 310. For example, user settings can indicate that negative feedback should trigger a halt (stop) of personally attributed audio playback mode, or revert back to a prior audio output (e.g., primary audio output prior to initializing personally attributed audio playback from another user). In additional implementations, feedback can be solicited at a later time, e.g., via a mobile application or message at audio gateway 210 and/or smart device 280 in order to train feedback. In some cases, the user 310 can exit the personally attributed audio playback mode with a gesture, voice command or tactile command, which may differ from the type and/or sub-type of command used to initiate the personally attributed audio playback mode. Additionally, a timeout mechanism can close the personally attributed audio playback mode if a selection is not made within a prescribed period.

In various implementations, logic 250 includes sensor data processing logic configured to process sensor data from sensor system 36 as well as any other sensors described with respect to audio gateway 210 and/or smart device 280, and provide a weighted localized representation to audio library lookup logic to enable fetching a type of audio content 265 for providing in the audio samples. That is, sensor data processing logic can include weightings or factoring for one or more of user preferences (e.g., user profile(s) 275), sensor data about past events (e.g., position and/or acceleration information about audio device 10 over given periods), audio files (e.g., audio samples of user's voices, or audio signatures such as ambient audio signatures, as sampled by microphone(s) in sensor system 36 or other devices), and other readily available data (e.g., a demographic profile of a plurality of users with at least one common attribute with the user 310, or a categorical popularity of audio content 265). The weighted localized representation may indicate a general characteristic of the location of user 310, etc., as a combination of factors from sensor data, profile(s) 275 and/or information from smart device 280. In particular examples, the weighted localized representation can be determined using at least one of a geofence, a local area network, a Bluetooth network, a cellular network, or a global positioning system (GPS), though other techniques may be used.

After processing sensor data with logic 250, additional audio library lookup logic can search audio library 260 for audio content 265 using the weighted localized representation from the sensor data processing logic. Library lookup logic may include a relational database with relationships between the weighted localized representation and audio content 265. As noted herein, audio library 260 can be locally stored at the personal audio device 10, audio gateway 210, smart device 280, and/or stored at one or more remote or cloud-based servers. Library lookup logic can be continually updated based upon changes in audio library 260 in order to provide accurate, timely associations between the weighted localized representation from the sensor data processing logic and audio content 265. The library lookup logic can utilize the weighted localized representation to determine which audio samples should be provided to the user 310 according to the user profile 275 and/or proximity to a geographic location.

In some example implementations, personally attributed audio engine 240 (e.g., using logic 250 including sensor data processing logic and/or library lookup logic) is configured to perform one or more of the following logic processes using data from sensor system 36 and/or other data accessible via profile system 270, smart device 280, etc.: speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice, acoustic event detection, two-dimensional (2D) or three-dimensional (3D) beam forming, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

In some implementations, personally attributed audio engine 240 is configured to work in concert with sensor system 36 to continually monitor changes in one or more environmental conditions. In some cases, sensor system 36 may be set in an active mode, such as where a position tracking system such as the IMU pings nearby Wi-Fi networks to triangulate location of the audio device 10, or microphone(s) 18 and/or 24 (FIG. 1) remain in a "listen" mode for particular ambient sounds. In other implementations, sensor system 36 and personally attributed audio engine 240 can be configured in a passive mode, such as where the network interface 34 at audio device 10 detects signals transmitted from nearby transceiver devices or network devices. In still other implementations, distinct sensors in the sensor system 36 can be set in distinct modes for detecting changes in environmental conditions and transmitting updated sensor data to personally attributed audio engine 240. For example, some sensors in sensor system 36 can remain in an active mode while audio device 10 is active (e.g., powered on), while other sensors may remain in a passive mode for triggering by an event.

In particular implementations, orientation tracking, which as noted herein can include head tracking and/or eye tracking, can be used to further define connections between users of audio devices (e.g., audio devices 10A, 10B, 10C, FIG. 3) via the personally attributed audio engine 240. That is, head tracking and/or eye tracking can be used to select personally attributed audio for playback at one or more audio devices. In certain cases, the personally attributed audio engine 240 is configured to receive head tracking data and/or eye tracking data indicating a direction in which the user 310 is facing, or more specifically, looking. For example, an eye tracking system (e.g., an optical eye tracking system or other conventional eye tracking device) in the sensor system 36 can send data to the personally attributed audio engine 240 indicating a direction in which a user 310A wearing an audio device 10A is looking (FIG. 3). The personally attributed audio engine 240 can use this look direction information to select personally attributed audio for playback, attributed to one or more other users 310B, 310C, etc. (FIG. 3) within the user's field of view. For example, in response to the personally attributed audio engine 240 detecting a particular number of users within a geographic location (e.g., geographic range or perimeter) relative to a primary user (e.g., user 310A), the personally attributed audio engine 240 can be configured to further refine the group of potential subject users (e.g., 310B, 310C, etc.) for which personally attributed audio playback is offered to the primary user. That is, eye tracking and/or head tracking can be used to define the priority of one subject user's personally attributed audio playback over another subject user's personally attributed audio playback. With FIG. 3 as an example, in particular cases where the eye tracking data and/or head tracking data indicates that the primary user 310A is facing a particular subject user 310C and/or looking in the direction of a particular subject user 310C within the defined geographic proximity (e.g., within a margin of measurement error), the personally attributed audio engine 240 can give priority to the personally attributed audio playback from that subject user 310C (relative to other subject user(s) 310B, etc.). According to some implementations, orientation, including head direction and/or eye direction, can be used to assign first priority to users within a given geographic location. That is, once a plurality of subject users 310B, 310C, etc. are identified by location tracking as being within a geographic range of the primary user 310A, the personally attributed audio engine 240 can assign priority to those subject users 310B, 310C based upon the look direction and/or eye direction of the primary user 310A (e.g., priority given to subject users aligned with the primary user's look direction). In certain cases, where the primary user 310A is determined to be looking away from all subject users 310B, 310C, additional priority mechanisms can be used, as described herein (e.g., social network connections, relative proximity, etc.). In various implementations, a subject user is determined to be aligned with the primary user's look direction when that subject user is within the primary user's field of view.

It is further understood that other devices such as audio gateway 210 and/or smart device 280 can receive selection commands and initiate functions by the personally attributed audio engine 240 based upon those selection commands. For example, the user 310 can actuate a selection command at the smart device 280, e.g., where smart device 280 includes a smart phone or wearable smart device such as a smart watch, with gesture detection (e.g., gyroscope/accelerometer/magnetometer), voice detection (e.g., with one or more microphones) and/or a user interface permitting actuation by the user. In other cases, the audio gateway 210 can include a smart phone or smart speaker with at least one of the above-noted detection or user interface functions. For example, the audio gateway 210 can include a smart speaker with voice detection and/or a user interface permitting actuation by user 310.

According to various implementations, playback of the personally attributed audio content (audio content 265) can be provided from any of the connected devices in system 200. In certain implementations, playback can be coordinated across multiple devices, e.g., the audio device 10, audio gateway 210 and/or smart device 280. For example, position information from sensors 36 can be obtained from audio device 10 and used to adjust playback at devices as the user (and audio device 10) moves relative to the audio gateway 210 and/or smart device 280.

With continuing reference to FIG. 2, in additional implementations, the microphone(s) in sensor system 36, audio gateway 210 and/or smart device 280 can be utilized to detect ambient acoustic signals proximate the audio device 10. The personally attributed audio engine 240 can be configured to modify playback of the audio content 265 (and/or samples of sources of audio content 265) at the audio device 10 based upon that ambient acoustic signal. For example, the personally attributed audio engine 240 can be configured, based upon default settings, user-defined settings, message-provider preferences, etc., to modify the audio playback of the personally attributed audio content according to the ambient acoustic signal received at sensor system 36 (e.g., microphone(s) 18 and/or 24).

In particular examples, the personally attributed audio engine 240 is configured to control ANR functions on the audio device 10 during playback of the personally attributed audio content. In these cases, the sensor system 36 can detect ambient acoustic signals indicating an ambient sound pressure level (SPL) that exceeds a threshold, such as a threshold for personally attributed audio playback, which can be stored in logic 250 or otherwise accessible to the personally attributed audio engine 240. The personally attributed audio engine 240 can be configured (during, and in some cases, proximal in time to the audio playback of the personally attributed audio content) to enable ANR (via ANR circuit 26) on the audio device 10 in response to the detected ambient SPL exceeding the threshold. In certain cases, prior to initiating audio playback of the personally attributed audio content, the personally attributed audio engine 240: a) requests ambient acoustic data about the SPL from the sensor system 36; b) compares that ambient acoustic data with the ambient SPL threshold, and c) in response to that ambient acoustic data deviating from the threshold, instructs the ANR circuit 26 to engage ANR (e.g., prior to initiating playback or simultaneously with the playback).

In various implementations, the personally attributed audio engine 240 can solicit feedback about the personally attributed audio mode via a feedback prompt, such as an audio prompt. For example, a feedback prompt can include a phrase such as "Did you enjoy this personally attributed audio experience?", or "Would you like to continue interacting with this personally attributed audio engine?" Additionally, in some cases, the audio prompt can include one or more tones. Feedback prompt can include any spoken phrase, word or clause intended to elicit a response from user 310, or can include a displayed prompt (e.g., similar to audio phrase, or with a Yes/No/Maybe or other visual prompt with touch-screen or push-button response capabilities), such as a prompt displayed at audio gateway 210 and/or smart device 280 or other device within range of user 310. In various implementations, a feedback prompt can be provided to the user 310 without an intervening audio input from user 310, such that user 310 is not required to prompt personally attributed audio engine 240 (e.g., by using an initiation term such as a name) in order to provide feedback. That is, in the case of eliciting verbal feedback the control circuit 30 can maintain the microphone(s) in sensor system 36 in a query mode during playback of the personally attributed audio content (e.g., audio content 265), such that the system actively awaits a response from the user 310. In some implementations, microphone(s) can remain in an optional response mode while providing the personally attributed audio content and/or feedback prompt. That is, control circuit 30 can maintain microphone(s) in a listen mode for a set period, with an expectation that user 310 may or may not respond (e.g., with a "Thanks," compliment or other feedback about the personally attributed audio content and/or feedback prompt). Additionally, other sensors in sensor system 36, such as the IMU, can be configured to remain in a query mode and/or optional response mode for a prescribed period in order to receive feedback from user 310.

In some cases, feedback from user 310 is processed by logic 250, e.g., feedback logic in order to improve functions of personally attributed audio engine 240. In some cases, where feedback inputs include an audio signal, the feedback logic may analyze those inputs using acoustic feature extraction for one or more features including: energy, zero-crossing rate, mel-frequency cepstral coefficients, spectral flatness, summary statistics (e.g., mean, variance, skew or kurtosis) on any signal measurement, tempo/beats-per-minute and acoustic fingerprinting. In some cases, the personally attributed audio content can include "text" metadata, which can allow personally attributed audio engine 240 to perform metadata feature extraction on those files (or streams) of content. This metadata feature extraction can include, for example, matching and linking features to a database (e.g., audio library 260) and/or retrieving/analyzing additional audio and semantic attributes of the personally attributed audio content, e.g., in the case of music: genre, mood, themes or related artists. Personally attributed audio engine 240 (and logic 250 therein) can use the acoustic, gestural or other feedback from user 310, and metadata features from personally attributed audio content, to perform statistical and probabilistic modeling in order to recommend future audio playback options in accordance with other functions.

In some cases, feedback logic can be configured to teach sensor data processing logic and/or library lookup logic about preferences of the user, e.g., where one or more of these logic components includes an artificial intelligence (AI) component for iteratively refining logic operations to enhance the accuracy of its results. Example AI components could include machine learning logic, a neural network including an artificial neural network, a natural language processing engine, a deep learning engine, etc. In any case, feedback logic can be configured to analyze feedback and enhance future operations of personally attributed audio engine 240. It is further understood that logic 250, including feedback logic, library lookup logic and/or sensor data processing logic may be interconnected in such a manner that these components act in concert or in reliance upon one another.

In some cases, the personally attributed audio engine 240 can be utilized with a mobile application, such as an application accessible on the audio device 10 or the smart device 280, and can provide an actuatable mechanism (e.g., an interface control, audio control or tactile control) for saving or modifying settings and preferences. The mobile application can be accessible via a conventional application store, and can be downloadable and capable of storage and/or access (e.g., via distributed or cloud computing access) via one or more of the audio device 10, audio gateway 210, and smart device 280.

Various aspects of the disclosure provide additional means for user expression and communication with other users in a dynamic environment. These aspects allow users to express themselves in terms of interest, mood, etc., without disengaging from their audio devices. In an increasingly device-connected world, these aspects of the disclosure can allow a variety of users to communicate, via personally attributed audio content, in a dynamic setting. By delivering this personally attributed content in audio form, the user can remain visually engaged in the environment while still enhancing their interaction with other proximate users.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method of controlling a wearable audio device configured to provide an audio output to a user, the method comprising:

receiving data indicating the wearable audio device is proximate an additional wearable audio device worn by an additional user and running a personally attributed audio engine; and initiating personally attributed audio playback at the wearable audio device in response to determining that the wearable audio device is proximate the additional wearable audio device, wherein the personally attributed audio playback comprises audio playback associated with the additional user, wherein, at a time when the personally attributed audio playback is initiated at the wearable audio device, the personally attributed audio playback is not played back at the additional wearable audio device worn by the additional user.

2. The computer-implemented method of claim 1, wherein initiating the personally attributed audio playback at the wearable audio device is performed in response to determining that the wearable audio device has permitted personally attributed audio playback from the additional wearable audio device, wherein the personally attributed audio playback is selected by the additional user, wherein the personally attributed audio playback is distinct from a current audio playback at the additional wearable audio device, and wherein determining that the wearable audio device is proximate the additional wearable audio device comprises determining that the wearable audio device and the additional wearable audio device are within a device-to-device connection range comprising one of: a Bluetooth range, a Bluetooth Low Energy (BLE) range, a Wi-Fi network range or a Zigbee network range.

3. The computer-implemented method of claim 1, wherein the personally attributed audio playback is selected by the additional user, or by the user of the wearable audio device based upon a stored categorization of the additional user.

4. The computer-implemented method of claim 1, wherein the personally attributed audio playback comprises music or an audible tone, wherein the personally attributed audio playback is variable based upon a context attributed to the wearable audio device, and wherein the personally attributed audio playback is selected by the additional user as a theme.

5. The computer-implemented method of claim 1, further comprising:

receiving data indicating the wearable audio device is proximate a further additional wearable audio device worn by a further additional user and running the personally attributed audio engine; and initiating the personally attributed audio playback from at least one of the additional wearable audio device or the further additional wearable audio device, at the wearable audio device, wherein the personally attributed audio playback from the further additional wearable audio device comprises audio playback associated with the further additional user, wherein, at a time when the personally attributed audio playback is initiated at the wearable audio device, the personally attributed audio playback is not played back at the further additional wearable audio device worn by the further additional user.

6. The computer-implemented method of claim 5, wherein the personally attributed audio playback from the additional wearable audio device and the personally attributed audio playback from the further additional wearable audio device are mixed at the wearable audio device, the method further comprising:

selecting between the personally attributed audio playback from the additional wearable audio device or the personally attributed audio playback from the further additional wearable audio device based upon a relative priority of the additional user as compared with the further additional user.

7. The computer-implemented method of claim 1, wherein proximity between the wearable audio device and the additional wearable audio device is determined by user settings defined by the user of the wearable audio device.

8. The computer-implemented method of claim 1, wherein the personally attributed audio playback is output at the wearable audio device in a spatially rendered audio location based upon a location of the additional user relative to the user.

9. The computer-implemented method of claim 1, further comprising:
receiving feedback about the personally attributed audio playback from the user at the wearable audio device, wherein the feedback comprises: a judgment score about the personally attributed audio playback; and
sending a signal to the additional wearable audio device indicating the judgment score from the user in response to receiving the judgement score.

10. The computer-implemented method of claim 1, wherein the additional wearable audio device comprises a plurality of additional wearable audio devices, wherein the method further comprises providing a report comprising a listing of the personally attributed audio playback for each of the plurality of additional wearable audio devices that have entered the proximity of the wearable audio device during a period.

11. The computer-implemented method of claim 1, wherein the additional wearable audio device comprises a plurality of additional wearable audio devices, wherein the method further comprises:
in response to the user entering a geographic location, prompting the user of the wearable audio device to initiate playback of the personally attributed audio playback for at least one of the plurality of additional wearable audio devices that have entered the geographic location within an already elapsed period.

12. The computer-implemented method of claim 1, wherein the additional wearable audio device comprises a plurality of additional wearable audio devices,
wherein the wearable audio device determines proximity to the plurality of additional wearable audio devices by:
sending location and orientation data associated with the wearable audio device to a cloud-based server;
receiving coordinate data from the cloud-based server about N number of additional wearable audio devices within a perimeter of the wearable audio device; and
receiving audio stream uniform resource locators (URLs) for the corresponding personally attributed audio playback from the cloud-based server,
wherein the wearable audio device is configured to access the personally attributed audio playback with the corresponding URL for the additional user.

13. A wearable audio device comprising:
a transducer for providing an audio output; and
a control circuit coupled with the transducer, the control circuit configured to:
receive data indicating the wearable audio device is proximate an additional wearable audio device worn by an additional user and running a personally attributed audio engine; and
initiate personally attributed audio playback at the wearable audio device in response to determining that the wearable audio device is proximate the additional wearable audio device,
wherein the personally attributed audio playback comprises audio playback associated with the additional user, wherein, at a time when the personally attributed audio playback is initiated at the wearable audio device, the personally attributed audio playback is not played back at the additional wearable audio device worn by the additional user.

14. The wearable audio device of claim 13, wherein initiating the personally attributed audio playback at the wearable audio device is performed in response to determining that the wearable audio device has permitted personally attributed audio playback from the additional wearable audio device, wherein the personally attributed audio playback is selected by the additional user, wherein the personally attributed audio playback is distinct from a current audio playback at the additional wearable audio device, and wherein determining that the wearable audio device is proximate the additional wearable audio device comprises determining that the wearable audio device and the additional wearable audio device are within a device-to-device connection range comprising one of: a Bluetooth range, a Bluetooth Low Energy (BLE) range, a Wi-Fi network range or a Zigbee network range.

15. The wearable audio device of claim 13, wherein the personally attributed audio playback is selected by the additional user, or by the user of the wearable audio device based upon a stored categorization of the additional user.

16. The wearable audio device of claim 13, wherein the personally attributed audio playback comprises music or an audible tone, wherein the personally attributed audio playback is variable based upon a context attributed to the wearable audio device, and wherein the personally attributed audio playback is selected by the additional user as a theme.

17. The wearable audio device of claim 13, wherein the control circuit is further configured to:
receive data indicating the wearable audio device is proximate a further additional wearable audio device worn by a further additional user and running the personally attributed audio engine; and
initiate the personally attributed audio playback from at least one of the additional wearable audio device or the further additional wearable audio device, at the wearable audio device,
wherein the personally attributed audio playback from the further additional wearable audio device comprises audio playback associated with the further additional user,
wherein, at a time when the personally attributed audio playback is initiated at the wearable audio device, the personally attributed audio playback is not played back at the further additional wearable audio device worn by the further additional user.

18. The wearable audio device of claim 17, wherein the personally attributed audio playback from the additional wearable audio device and the personally attributed audio playback from the further additional wearable audio device are mixed at the wearable audio device, and wherein the control circuit is further configured to select between the personally attributed audio playback from the additional wearable audio device or the personally attributed audio playback from the further additional wearable audio device based upon a relative priority of the additional user as compared with the further additional user.

19. The wearable audio device of claim 13, wherein proximity between the wearable audio device and the additional wearable audio device is determined by user settings defined by the user of the wearable audio device.

20. The wearable audio device of claim 13, wherein the personally attributed audio playback is output at the wearable audio device in a spatially rendered audio location based upon a location of the additional user relative to the user.

21. The wearable audio device of claim 13, wherein the control circuit is further configured to:
receive feedback about the personally attributed audio playback from the user at the wearable audio device,
wherein the feedback comprises: a judgment score about the personally attributed audio playback; and
sending a signal to the additional wearable audio device indicating the judgment score from the user in response to receiving the judgement score.

22. The wearable audio device of claim 13, wherein the additional wearable audio device comprises a plurality of additional wearable audio devices, wherein the method further comprises providing a report comprising a listing of the personally attributed audio playback for each of the plurality of additional wearable audio devices that have entered the proximity of the wearable audio device during a period, wherein settings for the wearable audio device prevent initiating of the personally attributed audio playback for at least one of the plurality of additional wearable audio devices in real time.

23. The wearable audio device of claim 13, wherein the additional wearable audio device comprises a plurality of additional wearable audio devices, wherein the control circuit is further configured to:
in response to the user entering a geographic location, prompt the user of the wearable audio device to initiate playback of the personally attributed audio playback for at least one of the plurality of additional wearable audio devices that have entered the geographic location within an already elapsed period.

24. The wearable audio device of claim 13, wherein the additional wearable audio device comprises a plurality of additional wearable audio devices,
wherein the control circuit determines proximity to the plurality of additional wearable audio devices by:
sending location and orientation data associated with the wearable audio device to a cloud-based server;
receiving coordinate data from the cloud-based serer about N number of additional wearable audio devices within a perimeter of the wearable audio device; and
receiving audio stream uniform resource locators (URLs) for the corresponding personally attributed audio playback from the cloud-based server,
wherein the wearable audio device is configured to access the personally attributed audio playback with the corresponding URL for the additional user.

25. A computer-implemented method of controlling a wearable audio device configured to provide an audio output to a user, the method comprising:
receiving data indicating the wearable audio device is proximate an additional wearable audio device worn by an additional user and running a personally attributed audio engine; and
initiating personally attributed audio playback at the wearable audio device,
wherein the personally attributed audio playback comprises audio playback associated with the additional user,
wherein the additional wearable audio device comprises a plurality of additional wearable audio devices,
wherein the wearable audio device determines proximity to the plurality of additional wearable audio devices by:
sending location and orientation data associated with the wearable audio device to a cloud-based server;
receiving coordinate data from the cloud-based server about N number of additional wearable audio devices within a perimeter of the wearable audio device; and
receiving audio stream uniform resource locators (URLs) for the corresponding personally attributed audio playback from the cloud-based server,
wherein the wearable audio device is configured to access the personally attributed audio playback with the corresponding URL for the additional user.

26. The computer-implemented method of claim 25, wherein the additional wearable audio device comprises a plurality of additional wearable audio devices, wherein the method further comprises providing a report comprising a listing of the personally attributed audio playback for each of the plurality of additional wearable audio devices that have entered the proximity of the wearable audio device during a period, wherein settings for the wearable audio device prevent initiating of the personally attributed audio playback for at least one of the plurality of additional wearable audio devices in real time.

27. The computer-implemented method of claim 25, wherein the additional wearable audio device comprises a plurality of additional wearable audio devices, wherein the method further comprises:
in response to the user entering a geographic location, prompting the user of the wearable audio device to initiate playback of the personally attributed audio playback for at least one of the plurality of additional wearable audio devices that have entered the geographic location within an already elapsed period.

* * * * *